United States Patent [19]

Casa et al.

[11] Patent Number: 5,037,967
[45] Date of Patent: Aug. 6, 1991

[54] N-PHENOXYALKYLENE ANILINES AS COUPLING COMPONENTS

[75] Inventors: Angelo D. Casa, Riehen; Peter Liechti, Arisdorf; Max Dempfle, Basel, all of Switzerland

[73] Assignee: Ciba-Geigy Corporation, Ardsley, N.Y.

[21] Appl. No.: 433,072

[22] Filed: Nov. 7, 1989

Related U.S. Application Data

[62] Division of Ser. No. 127,813, Dec. 2, 1987, Pat. No. 4,910,299.

Foreign Application Priority Data

[30] Dec. 9, 1986 [CH] Switzerland ................ 4908/86

[51] Int. Cl.$^5$ .................. C09B 43/28; C09B 33/16; D06P 1/18
[52] U.S. Cl. .................... 534/847; 534/596; 534/598; 534/756; 534/829; 534/831; 534/850; 534/855; 534/859; 534/887; 534/759
[58] Field of Search ............. 534/856, 859, 839, 596, 534/598, 847, 850, 855

[56] References Cited

U.S. PATENT DOCUMENTS 2,787,614  4/1957  Huber et al. ............... 534/596
3,459,728  8/1969  Entschel et al. ............ 534/598 X

FOREIGN PATENT DOCUMENTS 2338681  1/1983  Fed. Rep. of Germany ...... 534/859
1443722  7/1976  United Kingdom ............ 534/856
2148924  6/1985  United Kingdom ............ 534/859

OTHER PUBLICATIONS

E. O. Woolfolk et al., J. Org. Chem., 27, 2653–5r (1962).
Mitsubishi, Chemical Abstracts, vol. 61, 9614a (1964).
Woolfolk et al., Chemical Abstracts, vol. 57, 1184a–e (1962).

Primary Examiner—Robert W. Ramsuer
Assistant Examiner—Fiona T. Powers
Attorney, Agent, or Firm—George R. Dohmann; Edward McC. Roberts

[57] ABSTRACT

Disperse dyes containing a monoazo coupling component of the formula

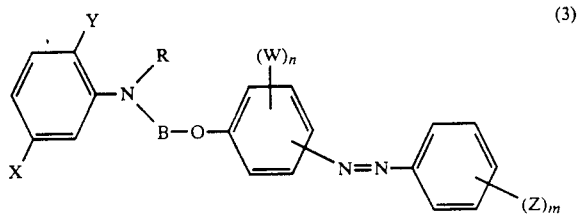

in which
X is hydrogen, $C_1$–$C_4$alkyl, $C_1$–$C_4$alkoxy, acylamino, halogen or a group of the formula —NH—CO—NHQ in which Q is hydrogen, $C_1$–$C_4$alkyl or phenyl,
Y is hydrogen, halogen, $C_1$–$C_4$alkyl, $C_1$–$C_4$alkoxy, $C_1$–$C_4$alkoxy-$C_1$–$C_4$alkyl or $C_1$–$C_4$alkoxy-$C_1$–$C_4$alkoxy,
R is hydrogen, $C_1$–$C_{12}$alkyl, $C_2$–$C_{12}$alkenyl or phenyl, or Y and R, together with the nitrogen atom and the two C atoms linking them, form a 5-membered or 6-membered ring,
B is a linear or branched $C_2$–$C_6$alkylene radical,
W is halogen, $C_1$–$C_4$alkyl or $C_1$–$C_4$alkoxy,
Z is halogen, $C_1$–$C_4$alkyl, $C_1$–$C_4$alkoxy or nitro and m and n are each 0, 1, 2 or 3.

1 Claim, No Drawings

N-PHENOXYALKYLENE ANILINES AS COUPLING COMPONENTS

This is a divisional of application Ser. No. 127,813 filed on Dec. 2, 1987, now U.S. Pat. No. 4,910,299.

The present invention relates to disperse dyes, to a process for their preparation and to their use for dyeing synthetic organic material.

The dyes according to the invention have the formula

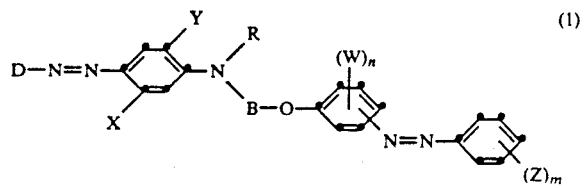

in which

D is the radical of a substituted or unsubstituted, homocyclic or heterocyclic diazo component belonging to the series comprising thienyl, thiazolyl, isothiazolyl, 1,2,4-thiadiazolyl, 1,3,4-thiadiazolyl, benzothiazolyl, benzoisothiazolyl, pyrazolyl, imidazolyl or phenyl, X is hydrogen, $C_1$-$C_4$-alkyl, $C_1$-$C_4$-alkoxy, acylamino, halogen or a group of the formula —NH—CO—NHQ in which Q is hydrogen, $C_1$-$C_4$-alkyl or phenyl, Y is hydrogen, halogen, $C_1$-$C_4$-alkyl, $C_1$-$C_4$-alkoxy, $C_1$-$C_4$-alkoxy-$C_1$-$C_4$-alkyl or $C_1$-$C_4$-alkoxy-$C_1$-$C_4$-alkoxy, R is hydrogen, $C_1$-$C_{12}$-alkyl, $C_2$-$C_{12}$-alkenyl or phenyl, or Y and R, together with the nitrogen atom and the two C atoms linking them, form a 5-membered ring or 6-membered ring, B is a linear or branched $C_2$-$C_6$-alkylene radical, W is halogen, $C_1$-$C_4$-alkyl or $C_1$-$C_4$-alkoxy, Z is halogen, $C_1$-$C_4$-alkyl, $C_1$-$C_4$-alkoxy or nitro and m and n are each 0, 1, 2 or 3.

D forms the radical of a homocyclic or heterocyclic diazo component belonging to the series comprising thienyl, thiazolyl, isothiazolyl, 1,2,4-thiadiazolyl, 1,3,4-thiadiazolyl, benzothiazolyl, benzoisothiazolyl, pyrazolyl, imidazolyl or phenyl. Each of these systems can carry further substituents, such as alkyl, alkoxy or alkylthio having in each case 1 to 4 carbon atoms, phenyl, electronegative groups, such as halogen, especially chlorine or bromine, trifluoromethyl, cyano, nitro, acyl, benzoyl, carboalkoxy, especially carbomethoxy or carboethoxy, alkylsulfonyl having 1 to 4 carbon atoms, phenylsulfonyl, phenoxysulfonyl, sulfonamide or arylazo, especially phenylazo. Any 2 adjacent substituents of the ring systems mentioned can together also form further fused rings, for example phenyl rings or cyclic imides.

D is preferably a benzothiazolyl or phenyl radical which is unsubstituted or is monosubstituted or disubstituted by one of the abovementioned radicals.

As a benzothiazolyl radical, D is, in particular, an unsubstituted benzothiazolyl radical or a benzothiazolyl radical which is monosubstituted or polysubstituted by methyl, methoxy, chlorine, methylsulfonyl or nitro.

The preferred meaning of D is phenyl which is substituted by not more than 4 substituents, which may be different, from the enumeration mentioned above. Of the substituents enumerated, electronegative substituents are preferred. These can be, in particular, cyano, methylsulfonyl, ethylsulfonyl, nitro, chlorine, bromine, formyl, acetyl, benzoyl, carbomethoxy, carboethoxy, methoxy, ethoxy or phenylazo.

In this application, alkyl groups are to be understood generally as linear or branched alkyl groups. They are, for example, methyl, ethyl, propyl, i-propyl, butyl, i-butyl, tert.-butyl, amyl, tert.-amyl (1,1-dimethylpropyl), 1,1,3,3-tetramethylbutyl, hexyl, 1-methylpentyl, neopentyl, 1-, 2- or 3-methylhexyl, heptyl, n-octyl, tert.-octyl, 2-ethylhexyl, n-nonyl, isononyl, decyl, dodecyl, cyclopentyl, cyclohexyl or methylcyclohexyl and the relevant isomers.

These alkyl radicals can be substituted, for example by hydroxyl, alkoxy having 1 to 4 carbon atoms, especially methoxy, cyano or phenyl. Other suitable substituents are halogen, such as fluorine, chlorine or bromine, or —CO—U or —O—CO—U in which U is alkyl having 1 to 6 carbon atoms or phenyl.

Suitable alkenyl radicals are those derived from the alkyl radicals listed above by the replacement of at least one single bond by a double bond. Examples of suitable radicals are ethenyl or propenyl.

Examples of suitable alkoxy radicals are methoxy, ethoxy, propoxy, isopropoxy, n-butoxy, i-butoxy or tert.-butoxy.

The following are examples of suitable substituted alkyl radicals: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl, 2-hydroxyethoxypentyl, cyanoethyl, hydroxyethyl or acetoxyethyl.

The alkylene radicals B can also be linear or branched or substituted. Examples of suitable radicals are ethylene, 1,3-propylene, 1,5-pentylene, 1,2-propylene, 1,2-butylene, 1,6-hexylene, 2-hydroxy-1,3-propylene or 2-chloro-1,3-propylene.

If X is an acylamino group, it is, for example, a group of the formula

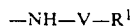

in which V is —CO— or —$SO_2$— and $R^1$ is alkyl or phenyl each of which is substituted or unsubstituted.

Examples of the acyl radical are the acetyl, propionyl-, 2-chloroethylcarbonyl-, 2-bromoethylcarbonyl-, phenylcarbonyl-, 2-methoxycarbonylethylcarbonyl-, 2-ethoxycarbonylethylcarbonyl-, methoxycarbonyl-, ethoxycarbonyl-, phenoxycarbonyl, methoxyethylcarbonyl-, hydroxyethylcarbonyl-, methylsulfonyl- or ethylsulfonyl radical.

If X is a group of the formula —NH—CO—NHQ, it is, for example, the ureido, methylureido, ethylureido or phenylureido group.

In this application, phenyl radicals are to be understood, in general, as meaning unsubstituted or substituted phenyl radicals. Examples of suitable substituents are $C_1$-$C_4$-alkyl, $C_1$-$C_4$-alkoxy, bromo, chloro, nitro or $C_1$-$C_4$-alkylcarbonylamino.

In this application generally, halogen is fluorine, bromine or, in particular, chlorine.

R and Y, together with the nitrogen atom and the two C atoms linking them, can form a 5-membered or 6-membered ring which can, if desired, contain an oxygen atom as a further heteroatom. Examples of suitable substituents for these rings are hydroxy, methyl, methoxy, chlorine or phenyl. Preferably, R and Y, together with the nitrogen atom and the two C atoms linking them, form a 6-membered ring which is unsubstituted or carries 1 to 4 methyl groups. These are, therefore, in particular dihydroquinoline or tetrahydroquinoline compounds having 0 to 4 methyl groups.

In particularly preferred disperse dyestuffs D is a benzothiazolyl radical which is unsubstituted or is monosubstituted or disubstituted by chorine or is a phenyl radical which is monosubstituted or disubstituted by nitro, chlorine, cyano, methylsulfonyl, ethylsulfonyl or phenylazo.

The preferred meanings of X are hydrogen, methyl, methoxy, chlorine, bromine, acetylamino or ureido, hydrogen, methyl, chlorine and acetylamino being particularly preferred. Y is preferably chlorine, methyl, methoxy, methoxyethyl or methoxyethoxy or, in particular, hydrogen. The preferred meaning of R is $C_1$–$C_4$-alkyl which is unsubstituted or subtituted by hydroxyl, $C_1$–$C_4$-alkoxy or phenyl. In particularly preferred compounds of the formula (1) R is methyl, ethyl or benzyl.

B is preferably a linear or branched alkylene radical which has 2 to 4 carbon atoms and which is unsubstituted or substituted by hydroxyl. The disperse dyestuffs of the formula (1) in which B is ethylene are particularly preferred.

The preferred meanings of W are chlorine, methyl or methoxy, but compounds in which n is nought are particularly preferred.

Z is preferably chlorine, methyl, methoxy or nitro, but compounds in which m is nought are particularly preferred.

The phenylazo radical carrying the substituent Z is preferably located in the p-position relative to the oxygen.

Dyes of the formula (1) which are of interest because of their good tinctorial properties are, in particular, those in which D is a benzothiazolyl radical which is unsubstituted or is monosubstituted or disubstituted by chlorine or is a phenyl radical which is monosubstituted or disubstituted by nitro, chlorine, cyano, methylsulfonyl, ethylsulfonyl or phenylazo, X is hydrogen, methyl, methoxy, chlorine, bromine, acetyl amino or ureido, Y is chlorine, methyl, methoxy, methoxyethyl, methoxyethoxy or hydrogen and R is $C_1$–$C_4$-alkyl which is unsubstituted or is substituted by hydroxyl, cyano, $C_1$–$C_4$-alkoxy or phenyl, B is a $C_2$–$C_4$-alkylene radical which is unsubstituted or substituted by hydroxyl, W is chlorine, methoxy or methyl, Z is chlorine, methyl, methoxy or nitro and m and n are each 0 or 1.

Amongst these dyes which are of very particular interest are those in which X is methyl, acetylamino, chlorine or hydrogen, Y is hydrogen, R is methyl, ethyl or benzyl, B is ethylene and m and n are each nought.

The compounds of the formula (1) are prepared in a manner known per se, for example by coupling a diazotized amine of the formula $$D\text{—}NH_2 \qquad (2)$$

with a compound of the formula

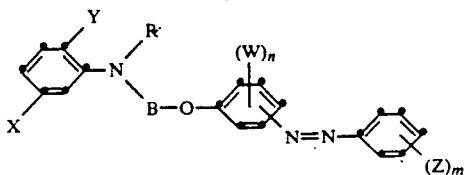

in which D, X, Y, R, B, W, Z, m and n are as defined under the formula (1).

The compounds of the formula (2) are known or can be prepared analogously to the preparation of similar compounds.

The compounds of the formula (3) are novel and form a further subject of the present invention. They are prepared, for example, by reacting a hydroxyazobenzene of the formula

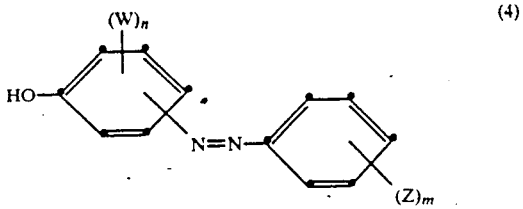

with a dihalogeno compound $$\text{Hal-B-Hal} \qquad (5)$$

to give a compound of the formula

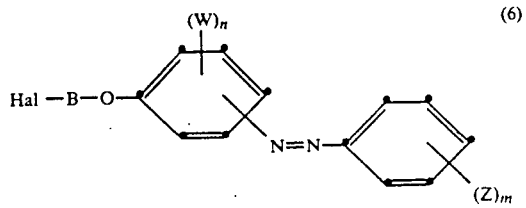

and then reacting the latter with an aniline derivative of the formula

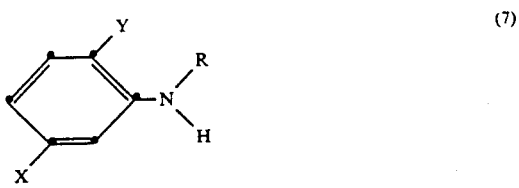

to give a compound of the formula (3).

In the formulae (4) to (7), W, Z, B, X, Y, R, n and m are as defined under the formula (1) and Hal is chlorine or bromine, it being possible for the two halogen atoms to be identical or different.

The compounds of the formula (4) and (5) are known or can be prepared in a known manner. The reaction of the compound (4) with the compound (5) is preferably carried out in an inert organic solvent and in the presence of a base. Examples of suitable inert organic solvents are compounds having a boiling point above 100° C., such as alcohols, ethers, esters, nitrobenzene, a halogenobenzene, toluene, xylenes etc. Particularly suitable solvents are higher-boiling alcohols, such as tert.-butanol, and ethers of polyhydric alcohols, for example diethylene glycol monoethyl ether or monomethyl ether and also the corresponding diethers.

The components (4) and (5) can be employed in a stoichiometric ratio, but an excess of one of the components, preferably the compound (5), often proves more advantageous.

The reaction temperature is between about 80° and 150° C., preferably between 100° and 130° C., and the reaction time is about 1 to 20 hours, depending on the temperature and the reactants. When the reaction is complete, the excess of the component (5) which may have been employed is removed and the resulting compound of the formula (6) is then reacted with an aniline derivative of the formula (7). This reaction is also preferably carried out in one of the abovementioned solvents. The temperature is normally above 100° C., in particular between 120° and 200° C. and especially between 140° and 180° C. The components (6) and (7) can be employed in a stoichiometric ratio, but normally the more readily accessible component, in most cases the aniline derivative (7), is employed in an excess, for example in a 10% excess. When the reaction is complete, the product is worked up in a customary manner, for example by removing the excess of the component (7) and the solvent and, if necessary, purifying the residue, for example by recrystallization. Both the reaction of the compounds (4) and (5) and the reaction of compounds (6) and (7) are carried out in the presence of a base, suitable bases being either organic or inorganic bases, for example pyridine, piperidine, triethylamine, sodium carbonate or bicarbonate or potassium carbonate or bicarbonate. This base is generally employed in a slight excess, for example in a 10% excess.

The entire preparation of the compound (3) can also be carried out as a so-called one-pot reaction, by employing the same solvent for the two reaction stages and not isolating the compound (6).

The diazotization of the compounds of the formula (2) and the coupling with the compounds of the formula (3) are carried out by the usual methods.

The compounds, according to the invention, of the formula (1) can be used as dyes for dyeing and printing semi-synthetic and, in particular, synthetic, hydrophobic fibre materials, in particular textile materials. Textile materials composed of mixed fabrics containing semi-synthetic or synthetic, hydrophobic textile materials of this type can also be dyed or printed by means of the compounds according to the invention.

Suitable semi-synthetic textile materials are, in particular, cellulose 2 ½-acetate and cellulose triacetate.

Synthetic, hydrophobic textile materials consist, in particular, of linear, aromatic polyesters, for example polyesters formed from terephthalic acid and glycols, especially ethylene glycol, or condensation products formed from terephthalic acid and 1,4-bis-(hydroxymethyl)-cyclohexane; polyesters composed of polycarbonates, for example those formed from α,α-dimethyl-4,4'-dihydroxydiphenylmethane and phosgene, and polyesters composed of fibres based on polyvinyl chloride or polyamides.

The application of the compounds according to the invention to the textile materials is carried out by known dyeing processes. For example, polyester fibre materials are dyed by the exhaustion process from an aqueous dispersion in the presence of customary anionic or nonionic dispersing agents and, if desired, customary swelling agents (carriers) at temperatures between 80° and 140° C. Cellulose 2½ acetate is preferably dyed between about 65° and 85° C. and cellulose triacetate is preferably dyed at temperatures up to 115° C.

The novel dyes dye wool and cotton present in the dyebath at the same time only slightly or not at all (very good reserve), so that they can also be used satisfactorily for dyeing polyester/wool and polyester/cellulose fibre mixed fabrics.

The dyes according to the invention are also suitable for dyeing by the thermosol process.

The textile material mentioned can be present in these processes in a very wide variety of processing forms, for example as fibres, threads or nonwovens or as woven or knitted fabrics.

It is advantageous to convert the dyes according to the invention, before use, into a dyeing preparation. This is effected by grinding the dye so that its average particle size is between 0.01 and 10 microns. The grinding can be carried out in the presence of dispersing agents. For example, the dried dye is ground with a dispersing agent or is kneaded in the form of paste with a dispersing agent and is then dried in vacuo or by atomizing. The preparations thus obtained can be used for dyeing and printing after the addition of water.

In printing, the customary thickeners will be used, for example modified or unmodified natural products, for example alginates, British gum, gum arabic, crystal gum, locust bean flour, tragacanth, carboxymethylcellulose, hydroxyethylcellulose or starch, or synthetic products, for example polyacrylamides, polyacrylic acid or copolymers thereof or polyvinyl alcohols.

The dyes according to the invention are virtually insensitive to carriers and impart to the materials mentioned, in particular to polyester material, level yellow to violet colour shades of very good fastness properties in use, such as, in particular, good fastness to light, thermofixing, pleating, chlorine and wet processing, such as fastness to water, perspiration and washing; the dyeings are also characterized by good pH stability and very good fastness to rubbing. Additionally, very deep dyeings are achieved. The good fastness to sublimation and the good fastness to thermofixing of the resulting dyeings should be singled out particularly.

The dyes according to the invention can also be used satisfactorily together with other dyes for the production of mixed shades. It is also possible, of course, to use mixtures of the dyes according to the invention with one another or mixtures of the dyes according to the invention with other disperse dyes.

The abovementioned use of the azo compounds, according to the invention, of the formula (1) also forms a subject of the present invention, as does a process for dyeing or printing semi-synthetic or synthetic, hydrophobic fibre material, in particular textile material, which consists in applying one or more compounds of the formula (1) to the material mentioned or incorporating them into this material. The hydrophobic fibre material mentioned is preferably textile polyester material. Further substrates which can be treated by the process according to the invention and preferred process conditions can be found above in the more detailed explanation of the use of the compounds according to the invention.

The invention also relates to the hydrophobic fibre material, preferably polyester textile material, which has been dyed or printed by the process mentioned.

The following examples illustrate the invention further, without limiting it thereto. Parts and percentages are by weight, unless stated otherwise.

EXAMPLE 1

1.73 g of 2-chloro-4-nitroaniline are suspended in 12.5 ml of water together with 4.4 ml of concentrated hydrochloric acid and approx. 0.05 g of a nonionic dispersing agent. The suspension is cooled to 0° to 5° C. and 2.6 ml of 4 N sodium nitrite solution are added dropwise. The mixture is stirred for a further hour at 0° to 5° C. and is filtered and excess nitrite is destroyed by means of sulfamic acid. The diazonium salt solution thus obtained is added dropwise, in the course of 1 hour and at 0° to 5° C., to a solution of 3.45 g of N-ethyl-N-2(4-phenylazophenoxy)-ethylaniline in 200 ml of glacial acetic acid. The mixture is then stirred for a further 2 hours at 0° to 5° C., 200 ml of icewater are added dropwise and 20 g of sodium acetate are added, whereupon the dye of the formula

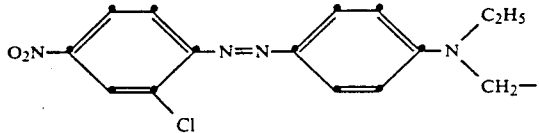

is precipitated.

The mixture is stirred for a further half hour at room temperature and is filtered and the residue is washed with water and a little methanol and is dried at 50° C. in vacuo.

The yield is approx. 83% of theory. The resulting dye dyes polyester fabric in red shades having very good fastness properties, in particular very good fastness to sublimation and thermal migration.

EXAMPLE 2

2.1 g of dichloro-2-aminobenzothiazol are dissolved at room temperature in a mixture of 20 ml of glacial acetic acid and 10 ml of propionic acid. 3.5 g of 40% nitrosylsulfuric acid are added dropwise at 0° to 5° C. and the mixture is stirred for a further hour. The diazonium salt solution thus obtained is added dropwise, in the course of 1 hour and at 0° to 5° C., to a solution of 3.45 g of N-ethyl-N-2-(4-phenylazophenoxy)-ethylaniline in 100 ml of dimethylformamide. The mixture is then stirred for a further 2 hours at 0° to 5° C., 75 ml of water are added dropwise and the mixture is stirred at room temperature for half an hour. The resulting dye of the formula

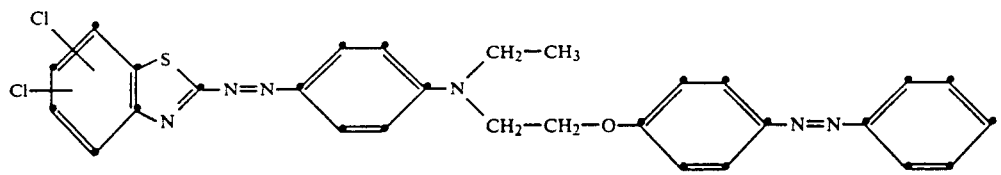

is filtered off with suction, washed with water and a little methanol and dried at 50° C. in vacuo. The yield is approx. 78% of theory. The resulting dye dyes polyester fabric in red shades having very good fastness properties, in particular very good fastness to sublimation and thermal migration.

EXAMPLES 3–106

The following dyes are prepared analogously to the procedure of Examples 1 and 2. They dye polyester fabric in the shades indicated and with good fastness properties.

| Example | Dye | Shade on polyester |
|---|---|---|
| 3 | 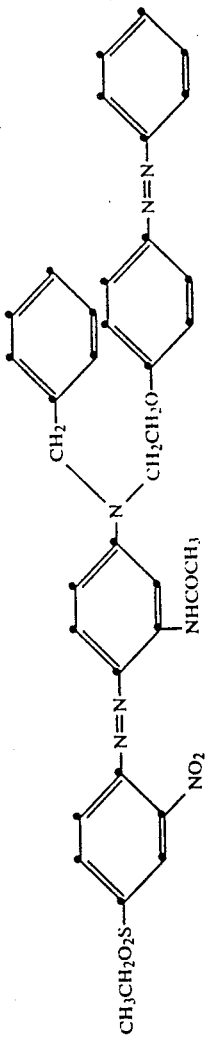 | red |
| 4 | 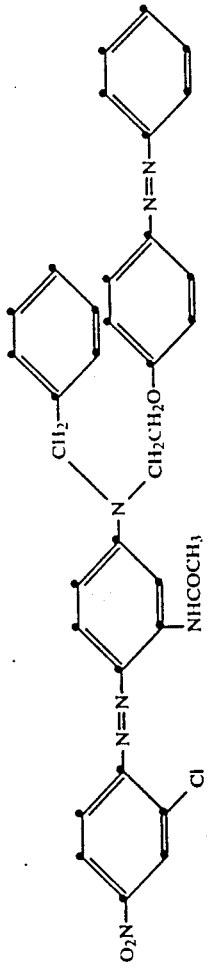 | red |
| 5 | 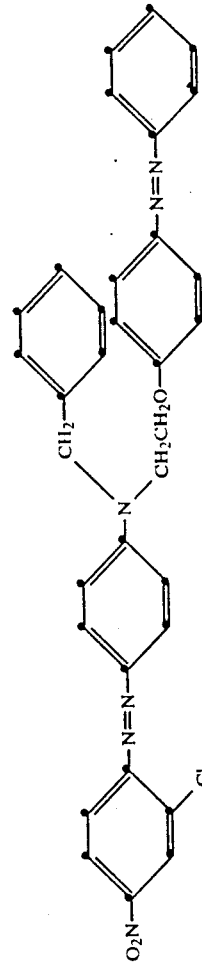 | scarlet-red |
| 6 | 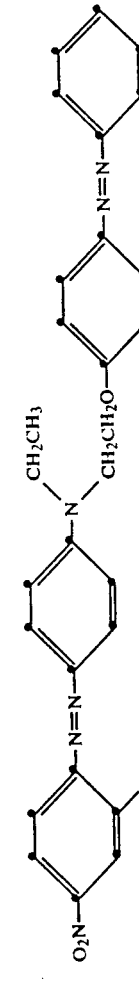 | burdeaux |
| 7 | 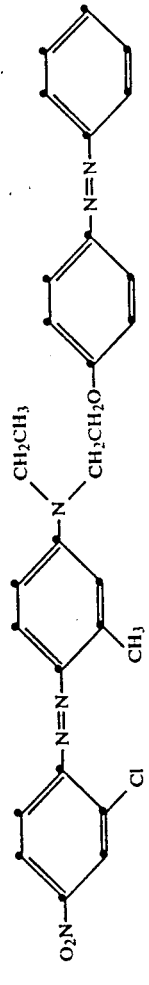 | red |

| Example | Dye | Shade on polyester |
|---|---|---|
| 8 | | orange |
| 9 | | red |
| 10 | | red |
| 11 | | red |
| 12 | | orange |
| 13 | | scarlet |

-continued
| Example | Dye | Shade on polyester |
|---|---|---|
| 14 | 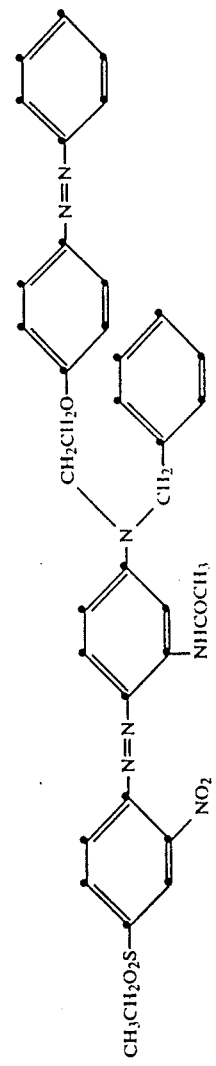 | red |
| 15 | 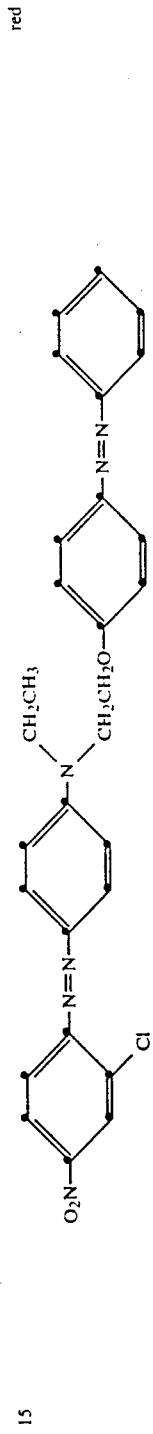 | red |
| 16 | 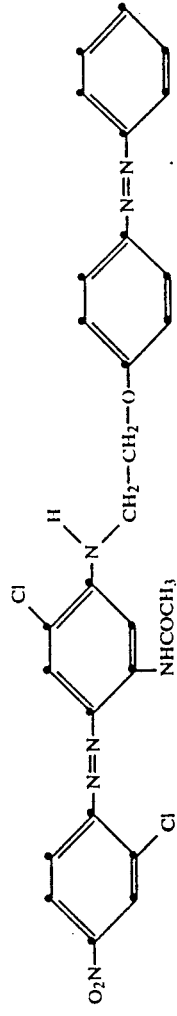 | red |
| 17 | 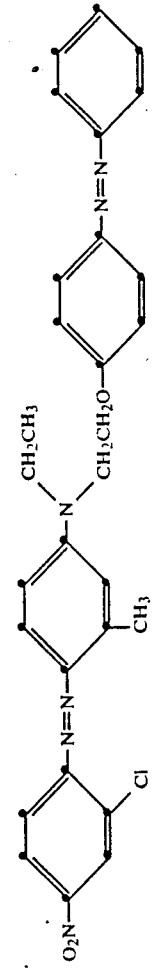 | ruby |
| 18 | 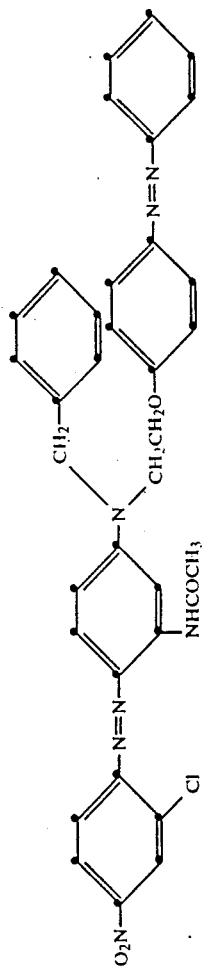 | red |

-continued

| Example | Dye | Shade on polyester |
|---|---|---|
| 19 | 2-chloro-4-nitrophenyl azo → [3-NHCOCH$_3$, 4-N(CH$_2$CH$_3$)(CH$_2$CH$_2$O–Ph)]benzene | red |
| 20 | 2-chloro-4-nitrophenyl azo → [4-N(CH$_2$C(CH$_3$)$_3$)(CH$_2$CH$_2$O–Ph)]benzene | red |
| 21 | 2-chloro-4-nitrophenyl azo → [3-NHCOCH$_3$, 4-N(CH$_2$CH$_2$OCOCH$_3$)(CH$_2$CH$_2$O–Ph)]benzene | red |
| 22 | 2-chloro-4-nitrophenyl azo → [4-N(CH$_2$Ph)(CH$_2$CH$_2$O–Ph)]benzene | scarlet |
| 23 | 5,6-dichlorobenzothiazol-2-yl azo → [4-N(CH$_2$Ph)(CH$_2$CH$_2$O–Ph)]benzene | scarlet |

-continued

| Example | Dye | Shade on polyester |
|---|---|---|
| 24 | 6-chloro-benzothiazol-2-yl azo → 6-Cl-benzothiazole-C=N-N=...phenyl(CH3)-N(CH2CH3)(CH2CH2O-C6H4-N=N-C6H5) | red |
| 25 | 6-Cl-benzothiazole-C=N-N=phenyl(NHCOCH3)-N(CH2CH3)(CH2CH2O-C6H4-N=N-C6H5) | rub |
| 26 | 6-Cl-benzothiazole-C=N-N=phenyl-N(CH2CH2O)(CH2CH3)-C6H4-N=N-C6H5 | red |
| 27 | 2-Br-4-NO2-6-CF3-C6H2-N=N-C6H3-N(CH2CH2O)(CH2CH3)-C6H4-N=N-C6H5 | scarlet |
| 28 | 2-CN-4-NO2-6-CF3-C6H2-N=N-C6H3-N(CH2CH2O)(CH2CH3)-C6H4-N=N-C6H5 | violet |

-continued
| Example | Dye | Shade on polyester |
|---|---|---|
| 29 | | ruby |
| 30 | | violet |
| 31 | | blue |
| 32 | | ruby |
| 33 | | violet |
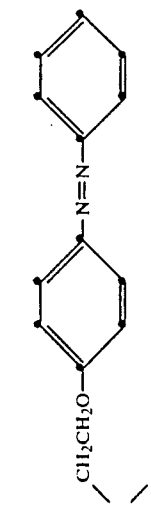
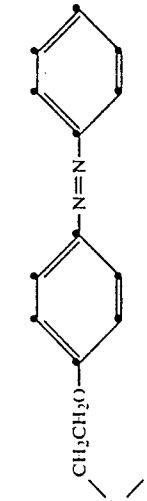
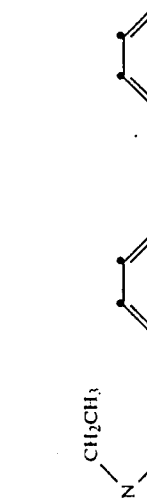
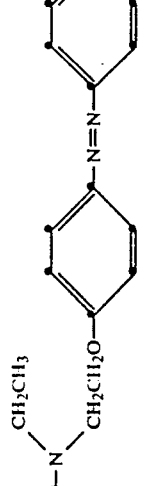

-continued

| Example | Dye | Shade on polyester |
|---|---|---|
| 34 | Br, O₂N-substituted phenyl–N=N–(2-methylphenyl)–N(CH₂CH₃)(CH₂CH₂O–C₆H₄–N=N–C₆H₅) | brown |
| 35 | Cl, CN, O₂N-substituted phenyl–N=N–(2-methylphenyl)–N(CH₂CH₃)(CH₂CH₂O–C₆H₄–N=N–C₆H₅) | violet |
| 36 | Cl, Br, O₂N-substituted phenyl–N=N–C₆H₄–N(CH₂CH₃)(CH₂CH₂O–C₆H₄–N=N–C₆H₅) | orange |
| 37 | Cl, CN, O₂N-substituted phenyl–N=N–C₆H₄–N(CH₂CH₃)(CH₂CH₂O–C₆H₄–N=N–C₆H₅) | violet |
| 38 | CH₃CH₂S–C(=N)–S–C(=N)–N=N–C₆H₄–N(CH₂CH₃)(CH₂CH₂O–C₆H₄–N=N–C₆H₅) thiadiazole derivative | orange |

-continued
| Example | Dye | Shade on polyester |
|---|---|---|
| 39 | 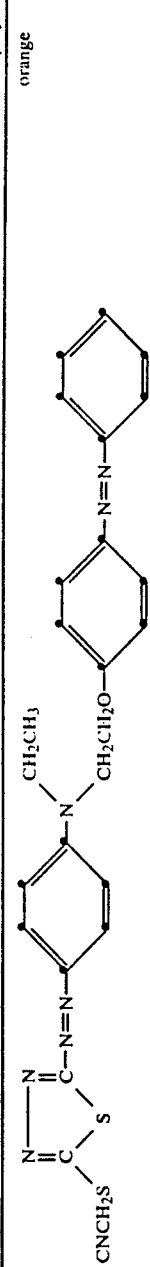 | orange |
| 40 | 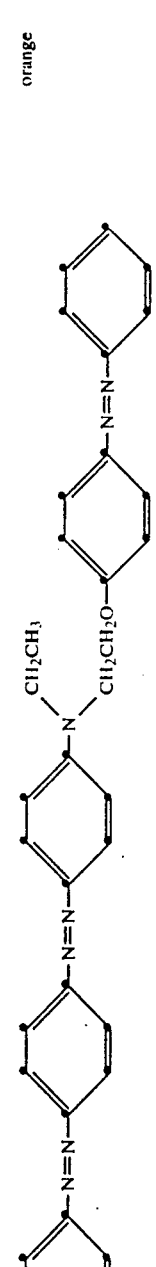 | orange |
| 41 | 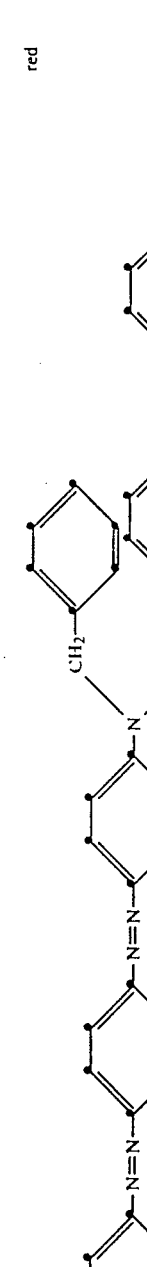 | red |
| 42 | 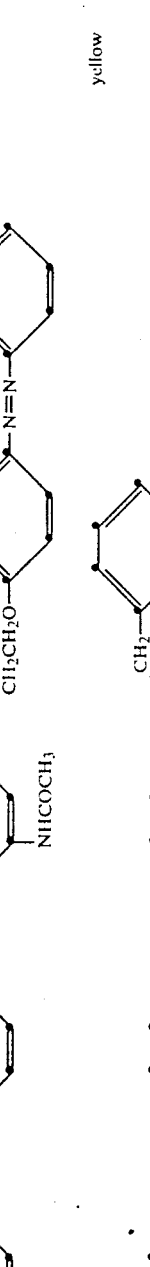 | yellow |
| 43 | 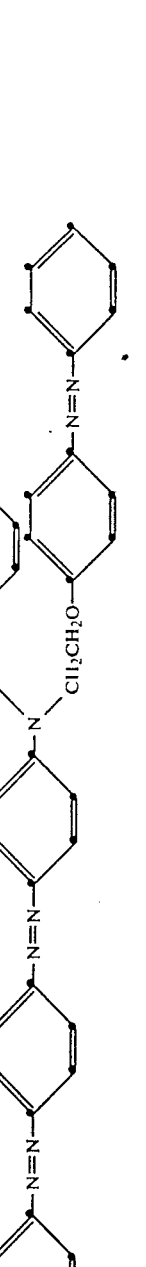 | orange |
| 44 | 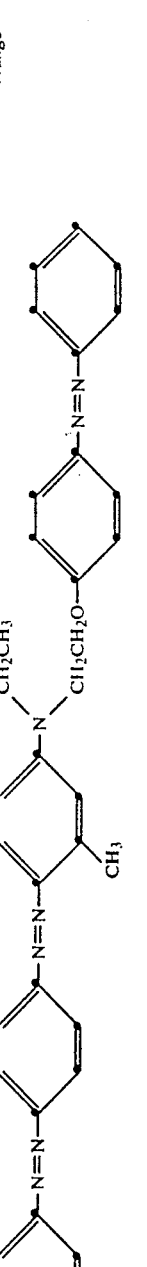 | red |

-continued

| Example | Dye | Shade on polyester |
|---|---|---|
| 45 | [thiazole-azo-(N-ethyl, N-ethoxy)aniline-azo-phenyl; thiazole bearing OSO₂-phenyl] | red |
| 46 | [thiazole-azo-(N-ethyl, N-ethoxy, NHCOCH₃)aniline-azo-phenyl; thiazole bearing OSO₂-phenyl] | violet |
| 47 | [thiazole-azo-(N-benzyl, N-ethoxy, NHCOCH₃)aniline-azo-phenyl; thiazole bearing OSO₂-phenyl] | ruby |
| 48 | [thiazole-azo-(N-benzyl, N-ethoxy)aniline-azo-phenyl; thiazole bearing OSO₂-phenyl] | red |
| 49 | [thiazole-azo-(N-ethyl, N-ethoxy)aniline-azo-(o-methyl)phenyl; thiazole bearing OSO₂-phenyl] | ruby |

-continued

| Example | Dye | Shade on polyester |
|---|---|---|
| 50 | 6-(methylsulfonyl)benzothiazol-2-yl azo coupled to 4-[N-ethyl-N-(2-phenoxyethyl)amino]phenyl, then azo-phenyl | red |
| 51 | 4-phenylthiazol-2-yl azo coupled to 4-[N-ethyl-N-(2-phenoxyethyl)amino]phenyl, then azo-phenyl | orange |
| 52 | 4-(4-methoxyphenyl)thiazol-2-yl azo coupled to 4-[N-ethyl-N-(2-phenoxyethyl)amino]phenyl, then azo-phenyl | ruby |
| 53 | 4-(4-nitrophenyl)thiazol-2-yl azo coupled to 4-[N-ethyl-N-(2-phenoxyethyl)amino]phenyl, then azo-phenyl | ruby |
| 54 | 2-bromo-4,6-dichlorophenyl azo coupled to 4-[N-ethyl-N-(2-phenoxyethyl)amino]phenyl, then azo-phenyl | yellow |

-continued

| Example | Dye | Shade on polyester |
|---|---|---|
| 55 | 2,6-dichloro-4-cyanophenyl → N=N → (NHCOCH₃ absent) phenyl-N(CH₂CH₃)(CH₂CH₂O-C₆H₅) | orange |
| 56 | 2-bromo-4,6-dichlorophenyl → N=N → 3-NHCOCH₃ phenyl-N(CH₂CH₃)(CH₂CH₂O-C₆H₅)—N=N—C₆H₅ | golden-yellow |
| 57 | 2-cyano-4,6-dichlorophenyl → N=N → 3-NHCOCH₃ phenyl-N(CH₂CH₃)(CH₂CH₂O-C₆H₅)—N=N—C₆H₅ | ruby |
| 58 | 2,6-dibromo-4-chlorophenyl → N=N → phenyl-N(CH₂CH₃)(CH₂CH₂O-C₆H₅)—N=N—C₆H₅ | yellow |
| 59 | 2,6-dicyano-4-chlorophenyl → N=N → phenyl-N(CH₂CH₃)(CH₂CH₂O-C₆H₅)—N=N—C₆H₅ | red |

-continued
| Example | Dye | Shade on polyester |
|---|---|---|
| 60 | 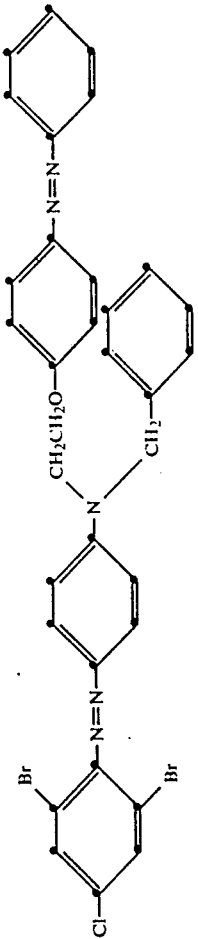 | yellow |
| 61 | 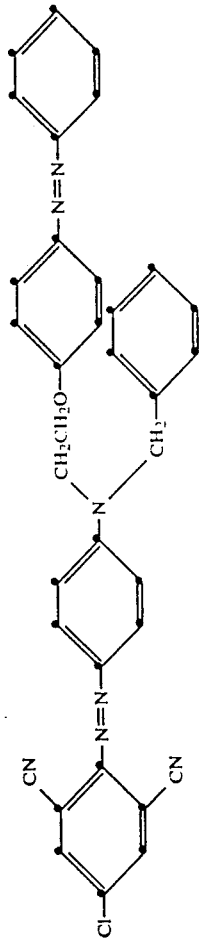 | red |
| 62 | 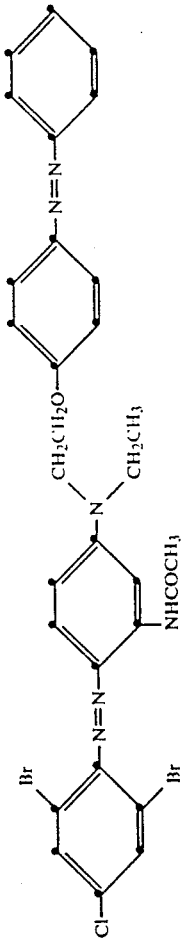 | golden-yellow |
| 63 | 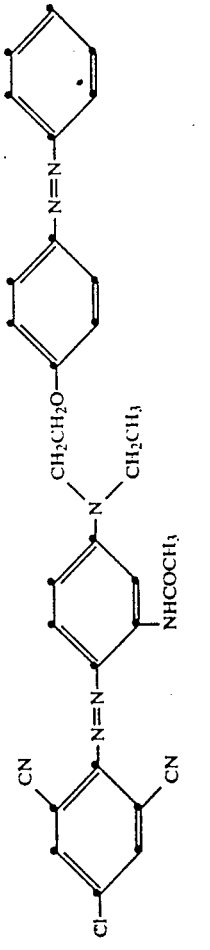 | ruby |
| 64 | 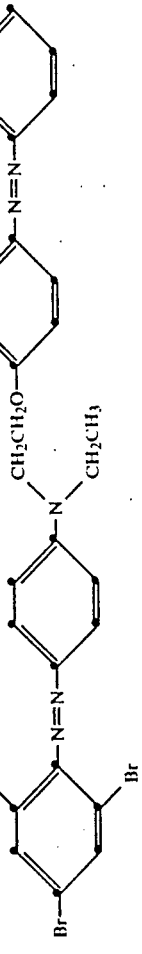 | yellow |

-continued

| Example | Dye | Shade on polyester |
|---|---|---|
| 65 | 4-Br-2-CF₃-C₆H₃-N=N-C₆H₃(2-CN)-N=N-C₆H₃-N(CH₂CH₃)(CH₂CH₂O-C₆H₄-N=N-C₆H₅) | scarlet |
| 66 | 4-Br-2-CF₃-C₆H₃-N=N-C₆H₃(2-Br)-N=N-C₆H₃(NHCOCH₃)-N(CH₂CH₃)(CH₂CH₂O-C₆H₄-N=N-C₆H₅) | golden-yellow |
| 67 | 4-Br-2-CF₃-C₆H₃-N=N-C₆H₃(2-CN)-N=N-C₆H₃(NHCOCH₃)-N(CH₂CH₃)(CH₂CH₂O-C₆H₄-N=N-C₆H₅) | ruby |
| 68 | 2,6-Br₂-4-CH₃-C₆H₂-N=N-C₆H₄-N(CH₂CH₃)(CH₂CH₂O-C₆H₄-N=N-C₆H₅) | yellow |
| 69 | 2,6-(CN)₂-4-CH₃-C₆H₂-N=N-C₆H₄-N(CH₂CH₃)(CH₂CH₂O-C₆H₄-N=N-C₆H₅) | scarlet |

-continued
| Example | Dye | Shade on polyester |
|---|---|---|
| 70 | 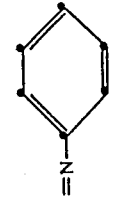 | yellow |
| 71 | 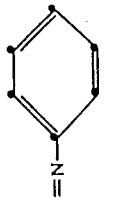 | ruby |
| 72 | 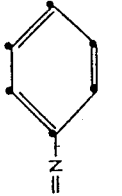 | yellow |
| 73 | 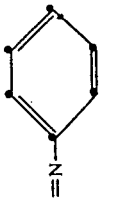 | red |
| 74 | 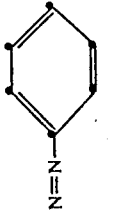 | orange |

-continued
| Example | Dye | Shade on polyester |
|---|---|---|
| 75 | 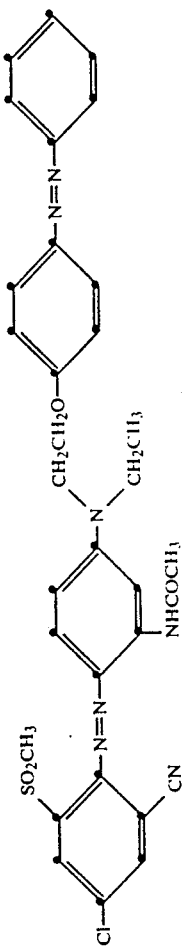 | ruby |
| 76 | 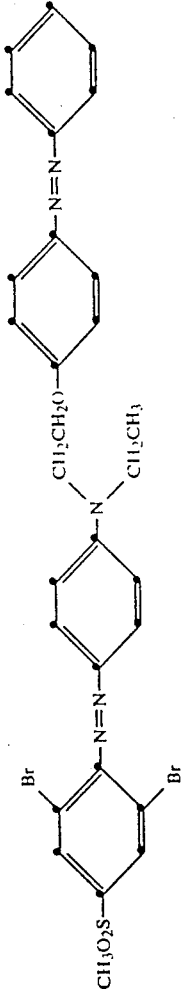 | yellow |
| 77 | 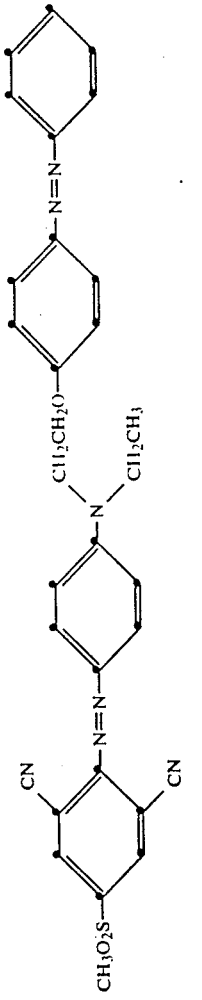 | violet |
| 78 | 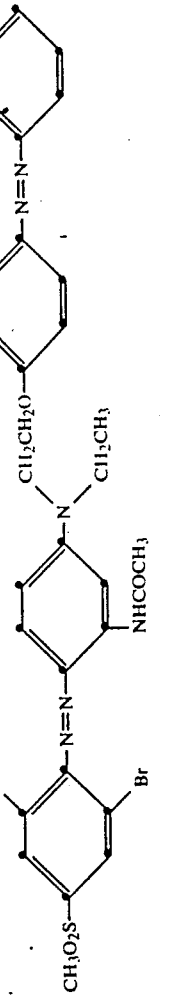 | orange |
| 79 | 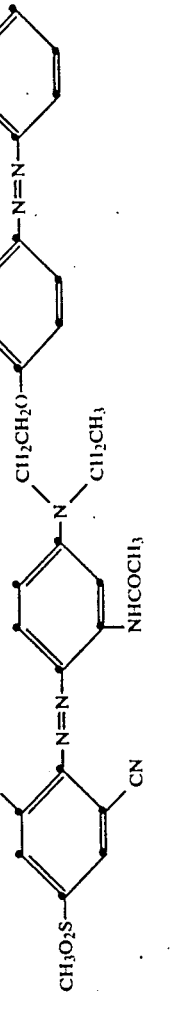 | violet |

-continued
| Example | Dye | Shade on polyester |
|---|---|---|
| 80 | 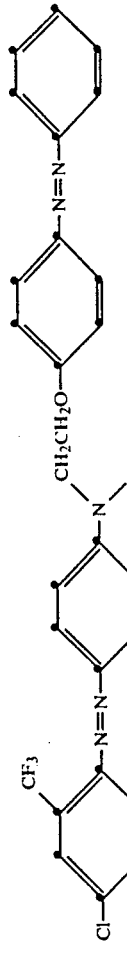 | yellow |
| 81 | 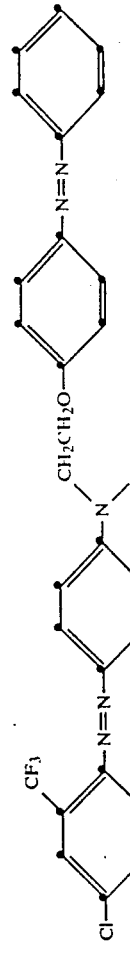 | orange |
| 82 | 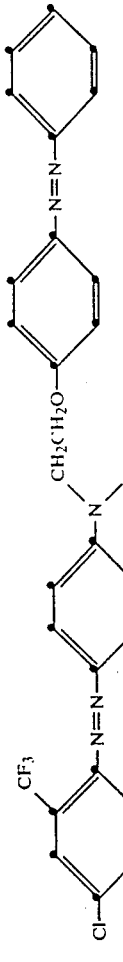 | orange |
| 83 | 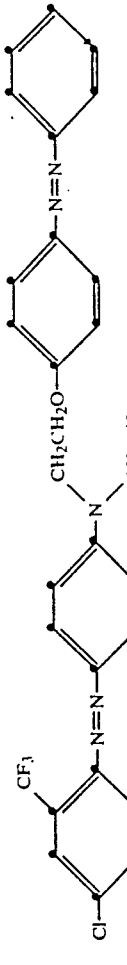 | red |
| 84 | 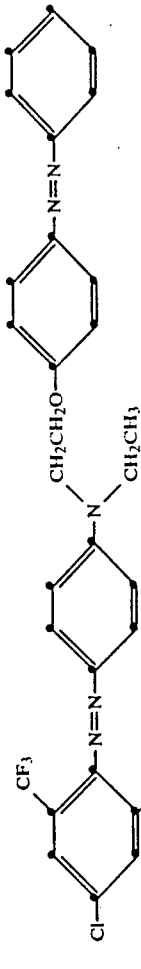 | orange |

-continued

| Example | Dye | Shade on polyester |
|---|---|---|
| 85 | 2,4-dinitrophenyl–N=N–phenyl[N(CH$_2$CH$_2$O-phenyl)(CH$_2$CH$_3$)]–N=N–phenyl | ruby |
| 86 | 2,4-dinitrophenyl–N=N–phenyl[N(CH$_2$-phenyl)(CH$_2$CH$_2$O-phenyl)]–N=N–phenyl | red |
| 87 | 2,4-dinitrophenyl–N=N–phenyl[N(CH$_2$CH$_2$CN)(CH$_2$CH$_2$O-phenyl)]–N=N–phenyl | scarlet |
| 88 | 2,4-dinitro-, 3-CH$_3$-phenyl–N=N–phenyl[N(CH$_2$CH$_3$)(CH$_2$CH$_2$O-phenyl)]–N=N–phenyl | violet |
| 89 | 2,4-dinitro-, NHCOCH$_3$-phenyl–N=N–phenyl[N(CH$_2$CH$_2$CN)(CH$_2$CH$_2$O-phenyl)]–N=N–phenyl | ruby |

-continued

| Example | Dye | Shade on polyester |
|---|---|---|
| 90 | 2,4-dinitrophenyl-azo-[3-chloro-4-(N-H, N-CH₂CH₂O-phenyl-azo-phenyl)-6-NHCOCH₃]benzene | red |
| 91 | phenyl-azo-[4-(N,N-di(CH₂CH₃))phenyl]-azo-[2-nitro-4-(phenyl-azo)]benzene | red |
| 92 | 2-chloro-4,6-dinitrophenyl-azo-[4-(N-CH₂CH₂CN, N-CH₂CH₂O-phenyl-azo-phenyl)]benzene | red |
| 93 | 2-chloro-4,6-dinitrophenyl-azo-[3-chloro-4-(N-CH₂CH₂CN, N-CH₂CH₂O-phenyl-azo-phenyl)-6-NHCOCH₃]benzene | violet |
| 94 | 2-chloro-4,6-dinitrophenyl-azo-[3-chloro-4-(N-H, N-CH₂CH₂O-phenyl-azo-phenyl)-6-NHCOCH₃]benzene | violet |

-continued

| Example | Dye | Shade on polyester |
|---|---|---|
| 95 | (structure) | violet |
| 96 | (structure) | ruby |
| 97 | (structure) | violet |
| 98 | (structure) | red |

-continued

| Example | Dye | Shade on polyester |
|---|---|---|
| 99 | (structure) | ruby |
| 100 | (structure) | ruby |
| 101 | (structure) | red |
| 102 | (structure) | red |
| 103 | (structure) | red |

-continued

| Example | Dye | Shade on polyester |
|---|---|---|
| 104 | [isothiazole-Cl,$O_2N$ fused ring]–N=N–[phenyl-CH$_3$]–N(CH(CH$_3$)C(CH$_3$)$_2$CH$_3$)(CH$_2$CH$_2$O–[phenyl]–N=N–[phenyl]) | blue |
| 105 | $O_2N$–[phenyl-Cl]–N=N–[phenyl]–N(C$_4$H$_9$)(CH$_2$CH$_2$O–[phenyl]–N=N–[phenyl]) | red |
| 106 | [benzothiazole-Cl,Cl]–N=N–[phenyl]–N(CH$_2$CH(C$_2$H$_5$)(CH$_2$)$_3$CH$_3$)(CH$_2$CH$_2$O–[phenyl]–N=N–[phenyl]) | red |

EXAMPLE 107

19.8 g of 4-hydroxyazobenzene are dissolved in 100 ml of diethylene glycol monoethyl ether, and 12.8 g of sodium carbonate and 52.5 ml of 1,2-dibromoethane are added. The mixture is heated to approx. 116° C. and is stirred for 2 hours at this temperature. The excess dibromoethane is then removed by steam distillation, and the water is subsequently removed by vacuum distillation at approx. 110° C. This gives a suspension containing approx. 26 g of an orange-red powder of the formula

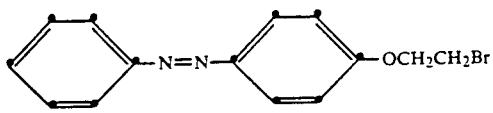

10.8 g of sodium carbonate and 11.3 ml of N-ethylaniline are added to this suspension, and the mixture is heated to 120° to 125° C. and is stirred for 12 hours at this temperature. The excess of N-ethylaniline is then removed by steam distillation. The reaction mixture is cooled to room temperature, whereupon a pale brown, viscous oil separates out. The water is decanted off, the oil is dissolved in acetone and the slight insoluble residue is removed by filtration. Ice and water are then added to the filtrate, and the precipitate which is deposited is filtered off with suction and washed with water. This gives approx. 23 g of a golden-yellow powder of the formula

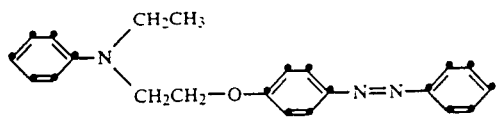

having a melting point of 80°–82° C.

EXAMPLES 108–113

The following compounds can be prepared analogously to the method described in Example 107.

108
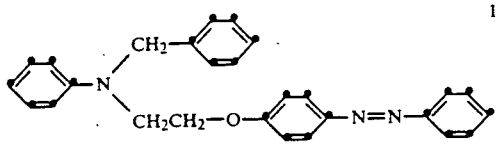

109
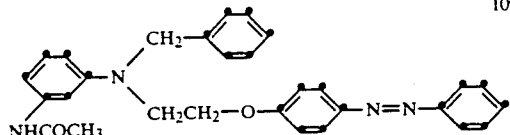

110
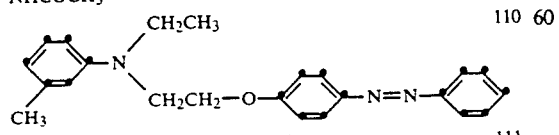

111
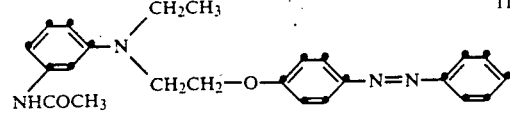

112
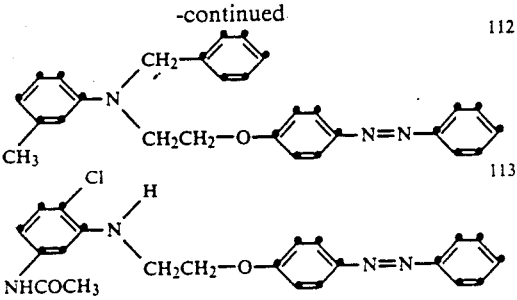

113

EXAMPLE 114

5 parts of the dye obtained in Example 1 are mixed with 10 parts of a dispersing agent of low salt content (of the dinaphthylmethanesulfonic acid type), and the mixture is ground in 85 parts of water in a microsol mill using 300 parts of glass spheres of diameter 0.5 mm.

4 parts of polyester fabric (Diolen) are dyed for one hour at 130° in 100 parts of a dye liquor adjusted to pH 4 and containing 0.2 part of above dispersion and 0.05 part of a wetting agent (for example fatty acid methyltauride) and 0.05 part of a dispersing agent (for example an agent based on dinaphthylmethanesulfonate). A red dyeing having very good fastness to light is obtained. The dyeing is also distinguished by excellent fastness to sublimation and thermofixing.

EXAMPLE 115

A polyethylene glycol terephthalate fabric is impregnated on a padder at 40° with a liquor of the following compostion:
20 parts of the dye preparation obtained in Example 114, finely dispersed in
10 parts of sodium alginate,
20 parts of nonionic wetting agent and 930 parts of water.

The fabric is squeezed out to approx. 60%, dried at 100° and then fixed for 60 seconds at a temperature of 210°. The dyed goods are rinsed with water, soaped or purified by reduction and dried. This gives a brilliant, light-fast, red dyeing which is distinguished, in particular, by good fastness to thermal migration.

What is claimed is:

1. A compound of the formula

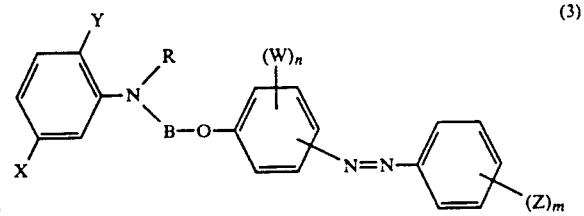

(3)

in which
X is hydrogen, $C_1$–$C_4$-alkyl, $C_1$–$C_4$-alkoxy, halogen, a group of the formula —NH—CO—NHQ in which Q is hydrogen, $C_1$–$C_4$-alkyl or phenyl, or a group of the formula —NH—V—$R^1$ in which V is —CO— or —$SO_2$ and $R^1$ is alkyl or phenyl,
Y is hydrogen, halogen, $C_1$–$C_4$-alkyl, $C_1$–$C_4$-alkoxy, $C_1$–$C_4$-alkoxy-$C_1$–$C_4$-alkyl or $C_1$–$C_4$-alkoxy-$C_1$–$C_4$-alkoxy,
R is hydrogen, $C_1$–$C_{12}$-alkyl, $C_2$–$C_{12}$-alkenyl or phenyl, or Y and R, together with the nitrogen atom and the two C atoms linking them form a dihydroquinoline or tetrahydroquinoline ring which is unsubstituted or substituted by hydroxy, methyl, methoxy, chlorine or phenyl,
B is a linear or branched $C_2$–$C_6$-alkylene radical,
W is halogen, $C_1$–$C_4$-alkyl or $C_1$–$C_4$-alkoxy,
Z is halogen, $C_1$–$C_4$-alkyl, $C_1$–$C_4$-alkoxy or nitro and m and n are each 0, 1, 2 or 3.

* * * * *